J. W. PEDIGO.
COMBINED ALFALFA SHOCKER AND TEDDER.
APPLICATION FILED OCT. 7, 1918.
1,366,485.
Patented Jan. 25, 1921.
4 SHEETS—SHEET 3.
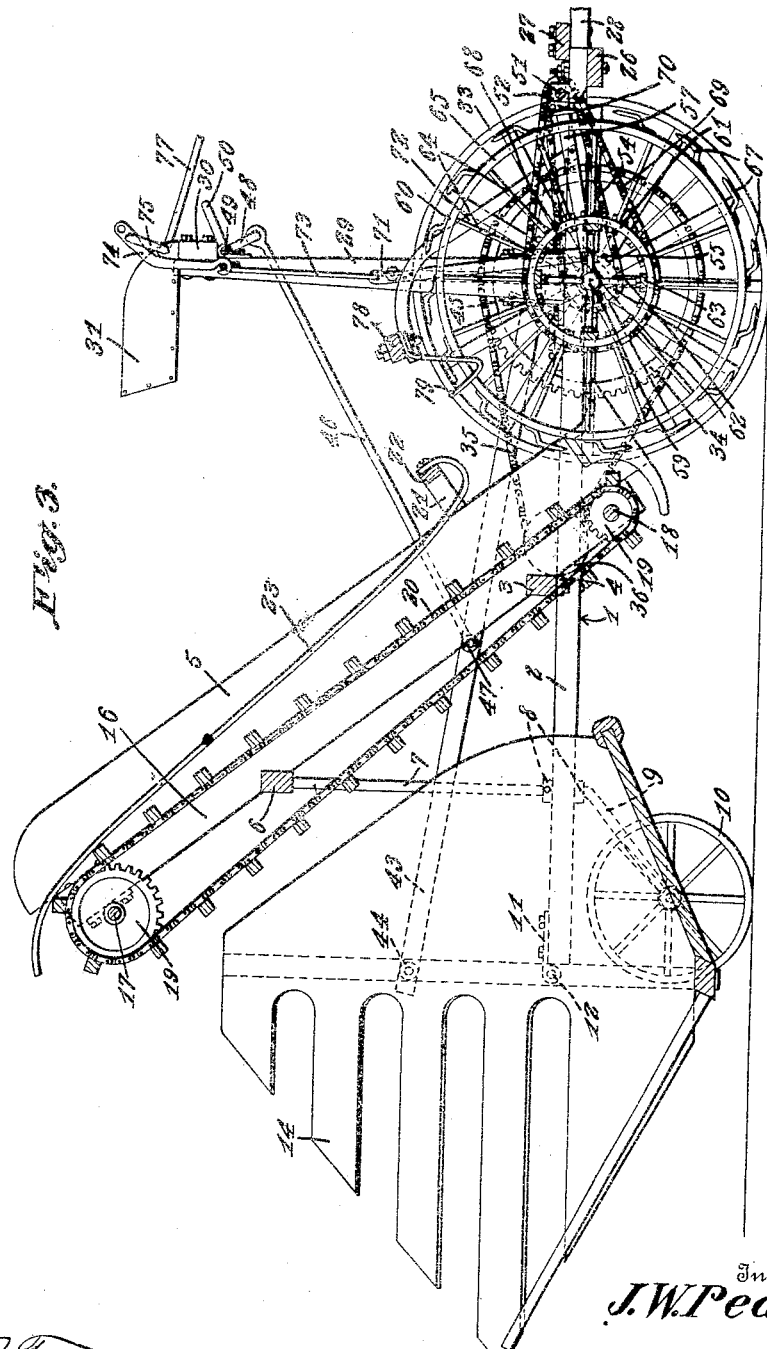

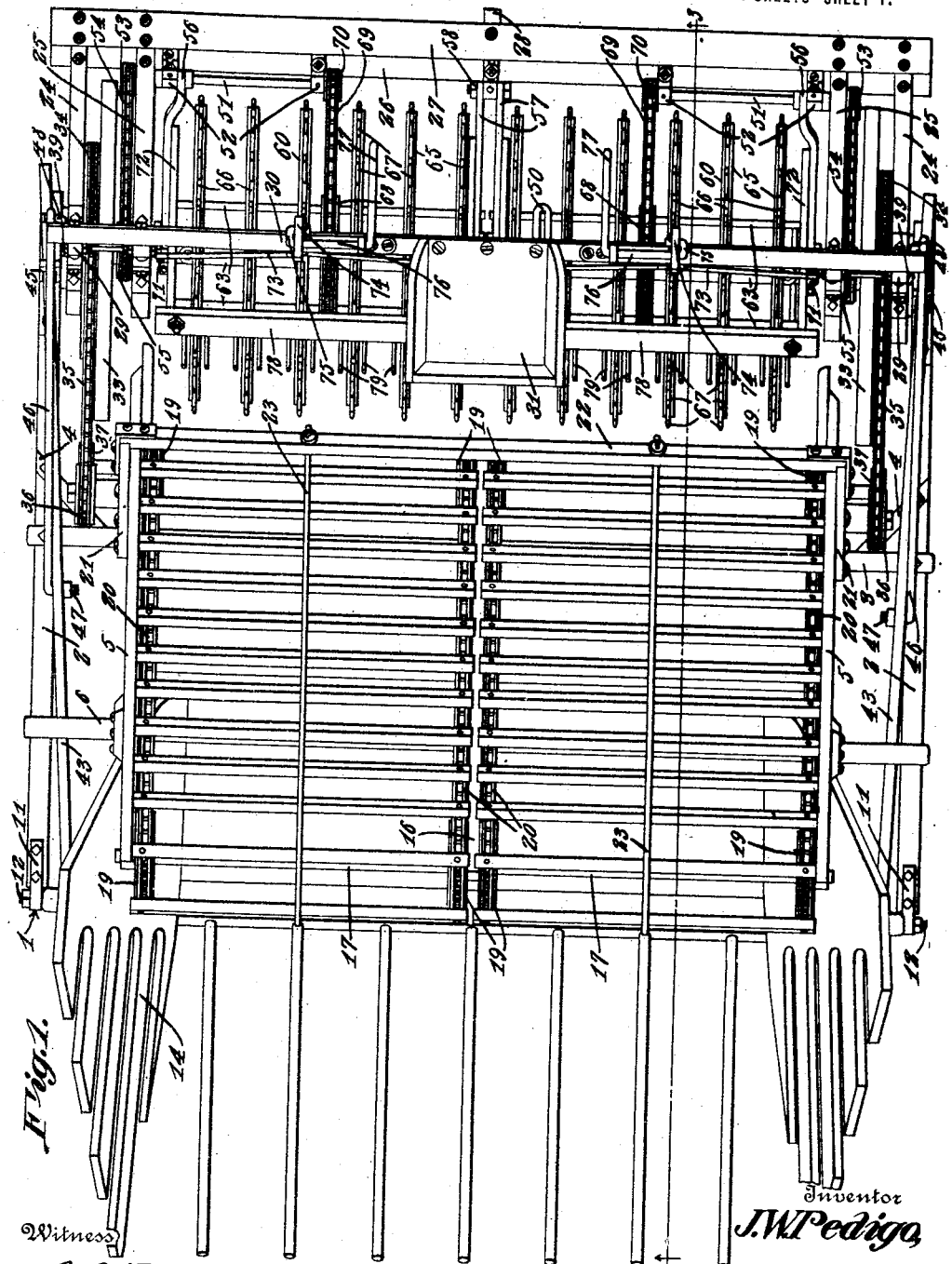

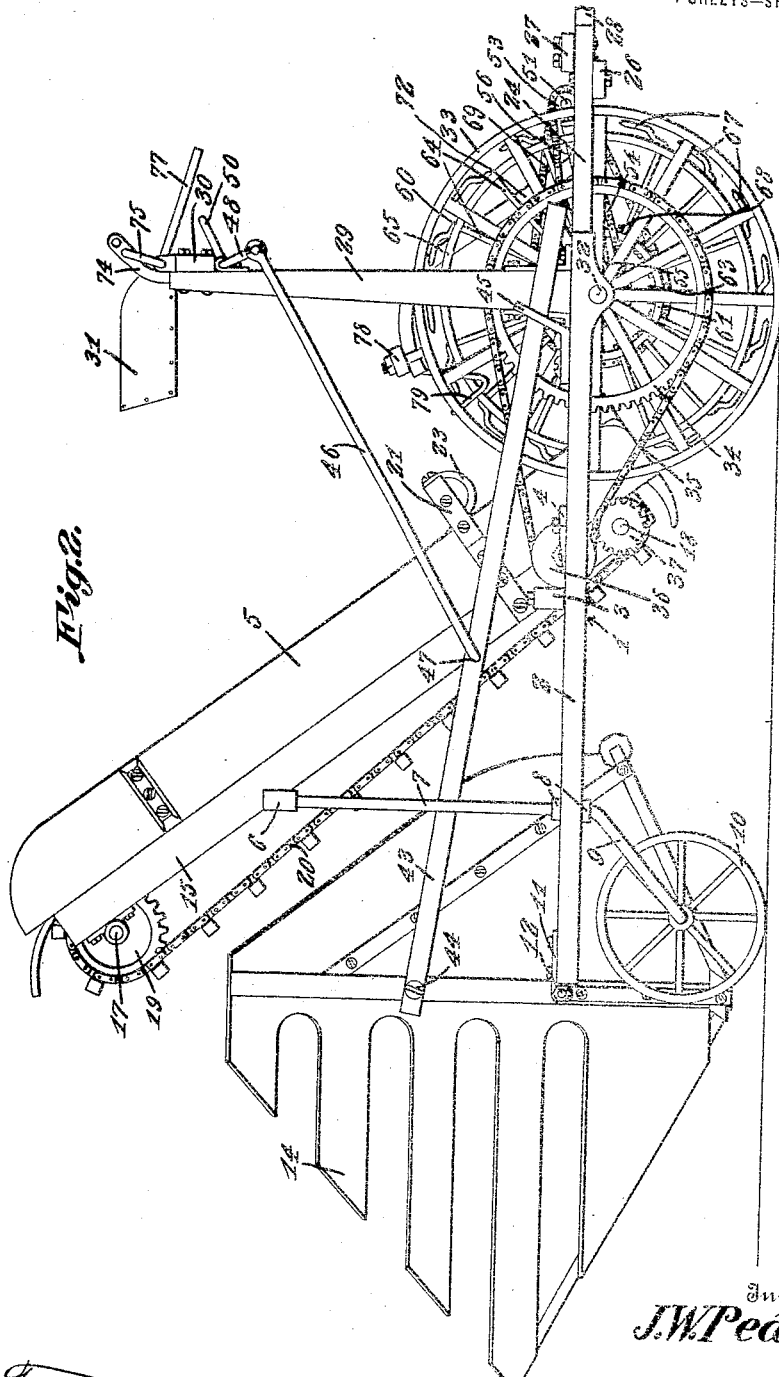

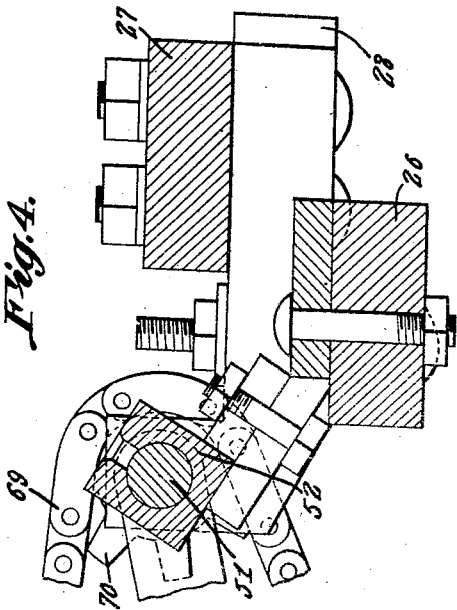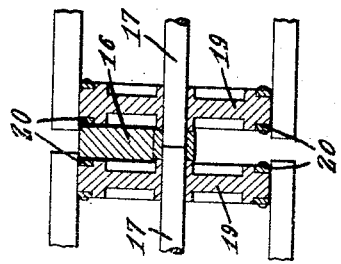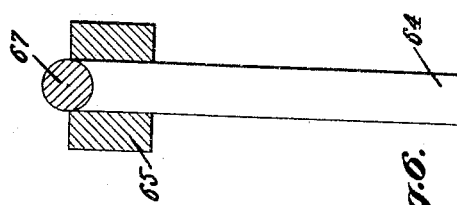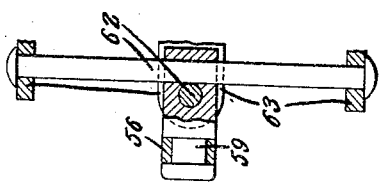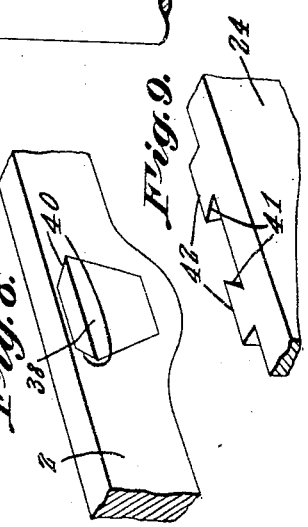

UNITED STATES PATENT OFFICE.

JESSE W. PEDIGO, OF TOPEKA, KANSAS.

COMBINED ALFALFA SHOCKER AND TEDDER.

1,366,485.  Specification of Letters Patent.  Patented Jan. 25, 1921.

Application filed October 7, 1918. Serial No. 257,179.

*To all whom it may concern:*

Be it known that I, JESSE W. PEDIGO, a citizen of the United States, residing at Topeka, in the county of Shawnee and State of Kansas, have invented a new and useful Combined Alfalfa Shocker and Tedder, of which the following is a specification.

The device forming the subject matter of this application is a combined alfalfa shocker and tedder, and one object of the present invention is to provide novel means for handling the shocker.

Another object of the invention is to provide novel means for operating the tedder or rotary rake.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Fig. 2 is a side elevation; Fig. 3 is a longitudinal section wherein parts appear in elevation; Fig. 4 is a sectional detail showing certain of the bearings; Fig. 5 is a sectional detail showing the conveyer shaft; Fig. 6 is a section taken partly through one of the rotary rakes; Fig. 7 is a sectional detail showing the mounting of the rakes; and Figs. 8 and 9 are perspective views illustrating the means whereby the auxiliary frame is connected with the main frame.

The device forming the subject matter of this application includes a rear frame 1 comprising longitudinal bars 2 connected by a lower cross bar 3 sustained from the longitudinal bars 2 by means of braces 4. The lower ends of longitudinal, upwardly inclined beams 15 are mounted on the cross bar 3, the beams 15 carrying chute plates 5. Near to their upper ends, the beams 15 are supported on an upper bar 6. Vertical shafts 7 are journaled at their upper ends in the upper bar 6 and are journaled in the longitudinal bars 2. The shafts 7 have upper and lower collars 8 coöperating with the upper and lower edges of the longitudinal bars 2. Although the shafts 7 can rotate in the bars 2 and 6, the upper collars sustain the shafts against downward movement, and the shafts, in turn, serve as supports for the upper bar 6. The shafts 7 are supplied with angularly disposed arms 9 on which caster wheels 10 are journaled. The shafts 7 can rotate in the bars 2 and 6, and the arms 9 can swing laterally in any desired direction, thereby permitting the caster wheels to conform to the configuration of the ground. The shafts 7 exercise a double function, in that they constitute a means for carrying the caster wheels 10, and constitute, also, a means for supporting the upper bars 6.

Bearings 11 are mounted on the rear ends of the bars 2 and in the bearings 11 shafts 12 are journaled for rotation, the same carrying a cradle 14. The bars 6 and 3 support a longitudinal beam 16 disposed midway between the beams 15. In the upper ends of the beams 15 and 16 upper shafts 17 are journaled. Lower shafts 18 are journaled in the lower ends of the longitudinal beams 15 and 16. The shafts 17 and 18 carry sprocket wheels 19 on which belt conveyers 20 are mounted, the upper runs of the belt conveyers being adapted to move upwardly and rearwardly between the chute plates 5. Standards 21 are attached to the chute plates 5 and to the longitudinal beam 16, near to the lower ends thereof, the upper ends of the standards 21 being connected by a bar 22, carrying rearwardly extended fingers 23, prolonged upwardly and rearwardly about the belt conveyers 20 and adapted to hold the hay thereon.

An auxiliary frame is provided, the same including longitudinal beams 24 and 25, connected by forward bars 26 and 27, a draft tongue 28 being assembled with the bars 26 and 27. Uprights 29 project from the beams 24 and 25 of the auxiliary frame and are connected by a cross beam 30 carrying a seat 31.

Shafts 32 are mounted to rotate in the beams 24 and 25 of the auxiliary frame, the shafts carrying ground wheels 33. Sprocket wheels 34 are mounted on the shafts 32, and about the sprocket wheels are trained sprocket chains 35, engaged with idlers 36, journaled for rotation on the beams 15. The lower runs of the sprocket chains 35 are engaged with sprocket wheels 37 mounted on the outer ends of the lower conveyer shafts 18.

In order to connect the auxiliary frame detachably with the main frame, wedges 38 are secured as shown at 39 to the longitudinal bars 2 of the rear or main frame 1, the wedges 38 having under cut longitudinal edges 40. The under cut longitudinal edges 40 of the wedges 38 are adapted to coöperate with the converging under cut edges 41 of ribs 42 attached to the bars 24 of the auxiliary frame. It will be obvious that, upon relative movement between the main and auxiliary frames, these frames can be separated, but, if the wedges 38 are engaged between the ribs 42 then the two frames will be held together.

Rods 43 are pivoted at 44 to the cradle 14 and are mounted to slide in guides 45 on the longitudinal bars 2. The rear ends of links 46 are pivoted at 47 to the bars 43, intermediate the ends of the bars. The forward ends of the links 46 are pivoted to crank arms 48 on a shaft 49 mounted to rock in bearings on the cross piece 30, the shaft 49 having a forwardly presented pedal 50 which is accessible from the seat 31.

Shafts 51 are journaled in bearings 52 on the bar 26. Outer sprocket wheels 53 are mounted on the shafts 51 and are engaged by sprocket chains 54 coöperating with sprocket wheels 55 on the shafts or axles 32 which carry the ground wheels 33. Rearwardly extended outer arms 56 are pivoted for vertical movement on the shafts 51, and rearwardly extended inner arms 57 are pivotally supported at 58 on the bar 26.

The invention comprises a pair of rotary rakes or tedders comprising shafts 59 journaled in the rear ends of the arms 56 and 57, the rotary rakes or tedders being denoted generally by the numeral 60. At the ends of the rakes 60 there are inner rings 61 connected with the shafts 59 by means of spokes 62. The rings 61 at the ends of each rake 60 are united by longitudinal bars 63. Spokes 64 project from the rings 61 and pass through outer rims 65, the rims having circumferential grooves 66 wherein are received, circumferentially inclined fingers 67 formed at the outer ends of the spokes 64. The longitudinal bars 63 of the rotary rakes 60 carry sprocket wheels 68 around which are engaged sprocket chains 69 coöperating with sprocket wheels 70 on the inner ends of the shafts 51. On the rear ends of the arms 56 there are uprights 71 connected with the arms by braces 72. The numeral 73 marks yokes connected with the upper ends of the uprights 71. With the intermediate portions of the yokes 73 curved links 74 are pivotally assembled, the links 74 being connected to crank arms 75 on shafts 76 journaled on the cross piece 30. The shafts 76 are operated by levers 77 accessible from the driver's seat 31. With the rear ends of the braces 72, transverse bars 78 are connected, the bars carrying hook-shaped fingers 79 alternating with the fingers 67 of the rotary rakes 60.

In practical operation, when the ground wheels 33 are rotated, rotation will be imparted to the rakes 60 by way of the sprocket wheels 55, the chains 54, the sprocket wheels 53, the shafts 51, the sprocket wheels 70, the sprocket chains 69, and the sprocket wheels 68. The sprocket wheels 68 are much larger in diameter than are the sprocket wheels 55, and as a consequence, the rakes 60 will rotate at a considerably lower speed than do the ground wheels 33. Consequently, although the rakes 60 will rotate, to cause the hay to be elevated, after the hay has been collected on the fingers 67, the fingers 67 will, nevertheless, collect the hay from the ground, as the machine is advanced. The fixed fingers 79 remove the hay from the rotary rakes 60, and cause the hay to be deposited on the lower ends of the belt conveyers 20.

The belt conveyers 20 are driven from the shafts 32 of the ground wheels 33 by means of the sprocket wheels 34, the sprocket chains 35, the sprocket wheels 37, the lower conveyer shafts 18, and the sprocket wheels 19 on the said shafts. Because the sprocket chains 35 are engaged around the idlers 36, it is not necessary to cross the sprocket chains, in order to drive the conveyers 20 in the right direction.

The hay having been received on the conveyers 20, is carried upwardly and dumped in the cradle 14. When a sufficient amount of hay has accumulated in the cradle 14, the cradle may be swung downwardly by operating the pedal 50, the shaft 49 being rotated, the crank arms 48 actuating the links 46, and the links causing the rods 43 to slide rearwardly. The cradle 14 is so counterpoised that, after it has deposited its load, it will gravitate into the elevated position shown in Fig. 2, to receive more hay from the conveyers 20. The members 23, which extend longitudinally of the belt conveyers 20, serve to retain the hay on the conveyers, while the hay is being elevated by the conveyers.

The rotary rakes 60 may be raised or lowered at any time at the will of an operator. In carrying out this operation, the shafts 76 are rotated by means of the levers 77, the crank arms 75 operating the links 74, the links actuating the yokes 73, the links operating the uprights 71, and the latter causing the arms 56 and 57 to swing upwardly or downwardly on the shafts 51. It is to be observed that, as shown in Fig. 3, when the rotary rakes 60 are raised, the upper ends of the links 74 project forwardly beyond a vertical plan passing through the axis of the shafts 76. Consequently, the weight of the rakes 60 will not be effective to carry the rakes downwardly, the rakes remaining elevated until the levers 77 are swung rearwardly.

Having thus described the invention, what is claimed is:—

1. In a device of the class described, a frame; a ground wheel thereon; a rotary rake journaled on the frame; means for driving the rake from the ground wheel in the same direction as the ground wheel, but at a slower speed than the ground wheel; shafts journaled on the frame; a conveyer coöperating with the shafts and receiving material from the rakes, an idler on the frame; a sprocket wheel movable with the ground wheel; a sprocket chain engaged around the idler and around the sprocket wheel; and a sprocket wheel on one shaft, the sprocket wheel engaging the lower run of the sprocket chain.

2. In a device of the class described, a frame comprising longitudinal bars; a transverse upper bar; shafts journaled at their upper ends in the upper bar and supporting said bar, the shafts being journaled at their lower ends in the longitudinal bars; collars on the shafts and coacting with the longitudinal bars, whereby the shafts will be supported against downward movement; caster wheels journaled on the lower ends of the shafts; a conveyer mechanism supported on the longitudinal bars and on the transverse upper bar; a rotary rake discharging into the conveyer; a ground wheel journaled on the frame; means for operatively connecting the rake with the ground wheel; and means for operatively connecting the conveyer mechanism with the ground wheel.

3. In a device of the class described, a frame; arms pivotally supported at their forward ends on the frame; a rotary rake journaled on the rear ends of the arms; uprights carried by the arms; means connected with the uprights for raising and lowering the arms and the rake; braces connecting the uprights with the arms; stripping fingers coöperating with the rake; means for mounting the fingers on the rear ends of the braces; a ground wheel journaled on the frame; and means for driving the rake from the ground wheel in the same direction as the ground wheel but at a lower speed than the ground wheel.

In testimony that I claim the foregoing as my own, I have hereto affixed my signature in the presence of two witnesses.

JESSE W. PEDIGO.

Witnesses:
R. EDWARD MARLINE,
OTIS GOODNOW.